United States Patent [19]

Fogleman

[11] 4,314,528
[45] Feb. 9, 1982

[54] CATTLE STANCHION HAVING A SIMPLIFIED SELF-LOCKING MECHANISM

[76] Inventor: Boyd C. Fogleman, 2170 Herron Rd., Whitsett, N.C. 27377

[21] Appl. No.: 144,655

[22] Filed: Apr. 28, 1980

[51] Int. Cl.³ .......................... A01K 1/06; A01K 1/08
[52] U.S. Cl. ................................. 119/147 R; 119/148
[58] Field of Search .......... 119/98, 99, 147 R, 147 A, 119/148, 149, 150

[56] References Cited

U.S. PATENT DOCUMENTS

| | | | |
|---|---|---|---|
| 341,107 | 5/1886 | Mead | 119/148 |
| 737,884 | 9/1903 | Thompson | 119/148 |
| 884,599 | 4/1908 | Miles | 119/147 |
| 1,239,906 | 9/1917 | Gutenkunst | 119/150 |
| 1,464,159 | 8/1923 | Troth | 119/148 |
| 1,752,095 | 3/1930 | Langer | 119/147 |
| 2,591,766 | 4/1952 | Anderson | 119/147 |
| 4,037,566 | 7/1977 | Albers | 119/147 |

*Primary Examiner*—Hugh R. Chamblee
*Assistant Examiner*—Robert P. Swiatek
*Attorney, Agent, or Firm*—Charles R. Rhodes; Judith G. Smith

[57] ABSTRACT

A multi-station cattle stanchion has a top rail with a trackway extending longitudinally of the stanchion in which the upper ends of a generally upright, J-shaped pivoting standard move laterally. A gravity operated locking bail is pivotally mounted at one end to the upper rail and includes an inclined tongue portion on the other end which extends into the path of the pivoting standard as it moves through the trackway. The tongue portion allows passage of the pivot standard in one direction, but blocks movement thereof in the other direction. A selectively activated lock disengaging plate may be moved by a master control rod into a position that lifts and holds the tongue portion out of the trackway.

9 Claims, 3 Drawing Figures

U.S. Patent      Feb. 9, 1982      4,314,528
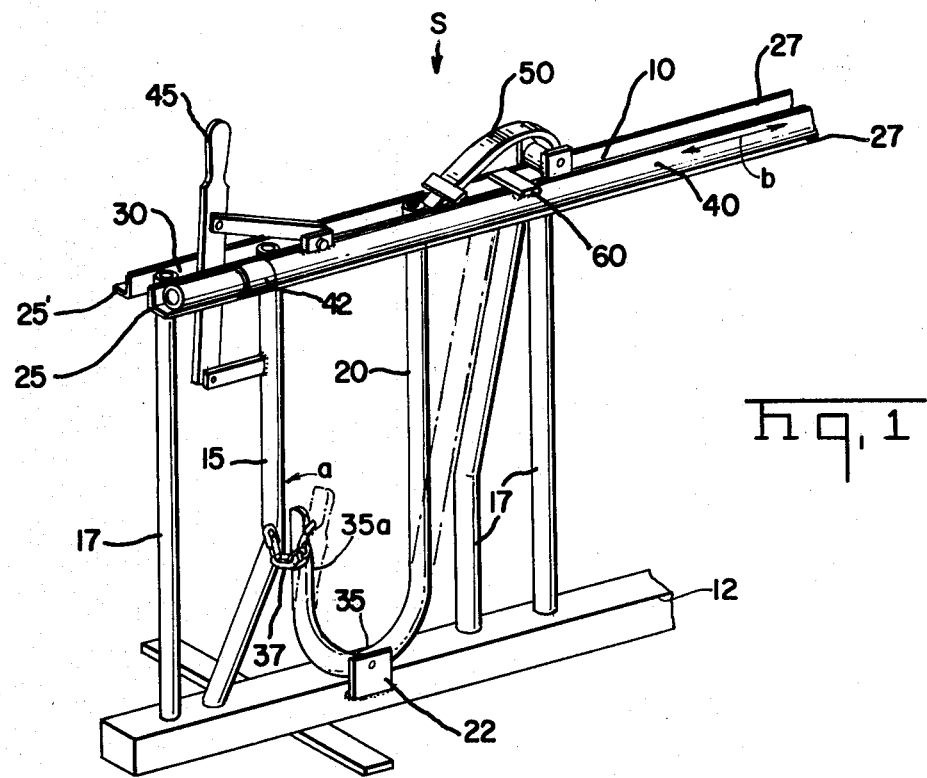
Fig. 1
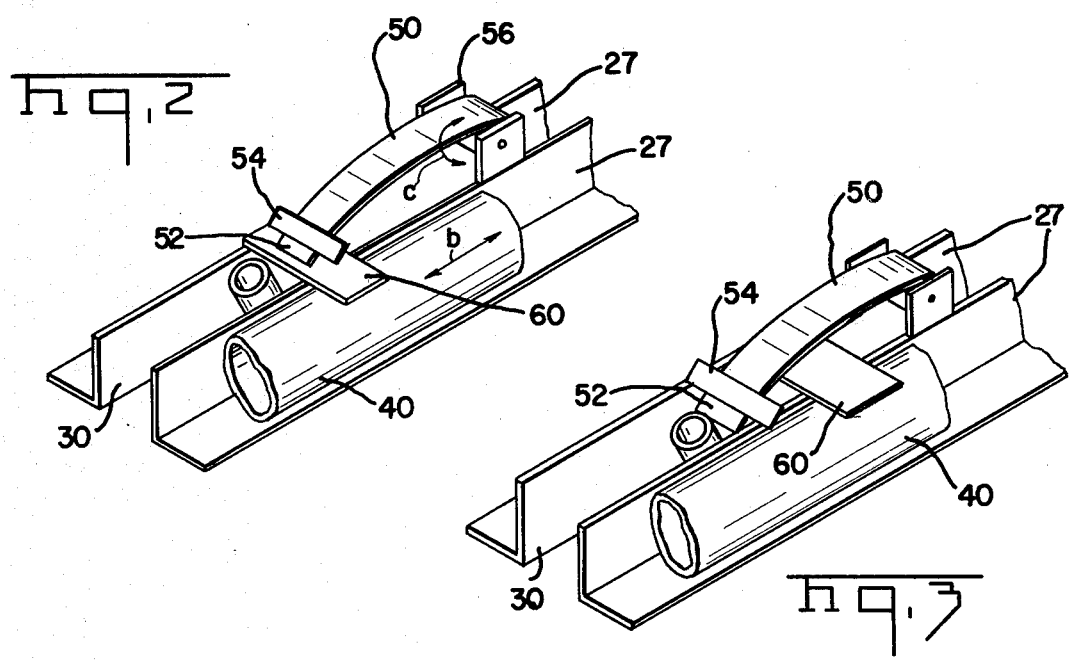
Fig. 2
Fig. 3

CATTLE STANCHION HAVING A SIMPLIFIED SELF-LOCKING MECHANISM

BACKGROUND AND SUMMARY OF THE INVENTION

The present invention relates to self-locking cattle stanchions of the type having a plurality of individual stations into which animals automatically lock themselves. Such stanchions are illustrated in U.S. Pat. Nos. 4,037,566 and 4,055,149; German publications Nos. 2,316,736 and 2,446,026; and French published application No. 2,242,929. As shown in these patents, the stanchions generally include a structure having a plurality of pairs of generally vertical standards defining the individual stations. One standard of each pair is pivotally mounted so that it swings away from the other stationary standard to permit the animal's head ingress or egress to the station. As the animal inserts its head between the two standards, movement of the animal's head trips the pivot standard to the closed position locking the animal therein.

As the state of the art has progressed various types of locking and release mechanisms have been utilized to control the ingress and egress of cattle from the stanchion. Most of these devices have been complex and expensive to produce, in addition to being expensive and time consuming to maintain because of the many components. Further, the locking mechanisms known before include a swivel element pivotally attached to the upper end of the swinging standard which slides along a track and generally drops into a slot or behind an abutment. Maintenance problems can be significant in instances where the stanchions include so many movable and cooperating components. Because of exposure to dampness in dairy barns, feeding shelters, etc., if the components are not kept clean and well-oiled there is increased likelihood of rust and consequent failure and damage. In the devices of the prior art, where rusting occurs easy movement of the swivel element and thus the entire swinging standard is curtailed making it difficult or frustrating for the animals to reach their food. It is also obviously more expensive to maintain such complex structures, especially where those locking components move back and forth continuously with the standard.

Mention should also be made of the fact that the swinging standards of the prior art are generally straight and pivoted at the center. So arranged the cow's head engages the lower inclined portion of the standard as its head is lowered for feeding to close the standard. Upon unlocking of the swinging standard, however, a force against the upper portion (above the pivot point) is necessary to open the station. This is not always reliable, particularly if the cow is pushing against the standard below the pivot point.

Other problems with the prior art self-locking mechanisms include ease of control in locking and releasing mechanism. These mechanisms have also generally been more complex than necessary to function. Many of them employ spring or other types of biasing means, complex pivot elements, all of which make the operation susceptible to jamming after continued use and exposure to moisture and dirt.

The present invention, however, is directed to an improved cattle stanchion and simplified locking-/release apparatus having a minimal number of components and potential friction induced jams. Thus, maintenance is considerably less time-consuming and expensive, in addition to the more economical initial production costs.

A preferred embodiment of the present invention includes a stanchion structure generally comprised of top and bottom, horizontally extending rails and a plurality of substantially vertical rods or posts extending therebetween in pairs to define the individual cattle stations. In each pair of standards, a first one is stationary and a second one is generally J-shaped and pivotally connected at its lower end to the bottom rail. The stationary standard and the adjacent, horizontally spaced, pivoting standard define an individual cattle station. The two standards cooperate such that the pivoting standard is in a first access position tilted away from the stationary standard to widen the opening sufficient to permit an animal to move its head therebetween. After the animal is positioned and lowers its head to eat, the movement of its head will tilt the pivoting standard toward the stationary standard to narrow the opening, automatically lock into place, and thus prevent the animal moving out of the station.

The swingable standard as noted above is preferably J-shaped, and pivotally attached at its lower end to the bottom rail. This shape of the swinging standard effects a counterbalance on the longer leg to normally urge the swinging standard toward an open position. The upper end moves back and forth within a horizontal trackway formed between two walls of the top rail. The track has at least an open bottom with sidewalls formed by the components of the top rail. A locking bail is pivotally mounted at one end along the upper edges of the sidewalls of the track and includes an inclined tongue portion extending down between the walls of the upper rail in operative locking relationship to the upper end of each swinging standard. The tongue allows movement of the upper end of the swingable standard in one direction, but not the other; e.g. as a ratchet mechanism operates.

A master control rod includes means to selectively support the free end of the locking bails of all stations out of the trackway in a deactivated position when it is desirable to open the stations or when it is undesirable for the cattle to lock themselves in their respective stations. When it is desirable for the cattle to lock themselves in, the control rod is moved horizontally to a second position whereby the bails are allowed to drop by gravity to an activated position within the track. As the cattle move into the stations and lower their heads, the motion of the head and neck will cause the swingable standard to tilt inwardly toward the stationary standard with the upper end of the swingable standard passing the tongue portions of the locking bail so that the standard cannot move back to its open position.

The master control rod includes a lock disengaging means in the form of a plate movable therewith from a position removed from said locking bail to a position underneath and supporting the tongue of the locking bail above the aforementioned track. In use, the pivoting standard would normally be in its freely moving mode with the control rod in a first, deactivated position whereby the locking bail is supported above the trackway. When it is time for the cattle to enter the stanchion the control rod is moved into the second, activated position wherein the locking bails are permitted to drop into the trackway a depth sufficient to lie in the path of the upper end of the swingable standard when it is moved toward the closed position by the cattle. Because the locking bails are freely pivoted in either vertical direction, and the tongue is inclined away from the path of movement at this time, they will ratchet upwardly out of the trackway when the pivot standard passes thereunder, then will drop back into the track to engage the upper end of the stanchion and block its movement in the opposite direction should the animal attempt to withdraw its head from the station.

Thus applicant has invented a cattle stanchion with a unique self-locking mechanism having a minimum number of moving elements, with each of the primary elements other than the control rod, being operative on a simple pivot means. All frictional engagement of relatively moving parts is very loose. The control rod moves horizontally adjacent the top rail by means of a simple handle and is held in place on the rail by a plurality of spaced, metal loops which are welded or otherwise secured to one side of the top rail to act as a channel for the control rod.

Thus, necessary maintenance is kept to a minimum and routinely involves merely keeping the control rod and pivot points relatively clear and lubricated. Should one of the pivot connections fail, repair would generally require only the replacement of a standard pivot pin. The stanchion structure is preferably of a tubular metal material but other materials are possible.

It is therefore an object of the present invention to provide a more reliable self-locking cattle stanchion having a minimum number of movable cooperative elements such that production and maintenance costs are as economical as possible. It is further desired that the operation of the stanchion be simplified and easily controlled by one operator.

The drawings include:

FIG. 1 illustrating a perspective view of a portion of a self-locking cattle stanchion provided with a locking mechanism according to a preferred embodiment of the invention;

FIG. 2 illustrating an enlarged detailed perspective view of the locking mechanism in a first, deactivated position; and FIG. 3 illustrates the locking mechanism of FIG. 2, in a second, activated position.

DETAILED DESCRIPTION OF A PREFERRED EMBODIMENT

Looking first at FIG. 1 the self-locking cattle stanchion S generally includes a horizontally extending top rail 10 and bottom rail 12, and a plurality of vertical standards 15, 17, 20 extending therebetween. The vertical standards include, aside from reinforcing bars 17, stationary standards 15 and swingable standards 20 arranged in cooperating pairs to form cattle stations, one of which is illustrated in FIG. 1. Each combination of a stationary bar or standard 15 and pivoting bar or standard 20 comprises an individual cattle station through which the animal places its head for feeding, milking, etc. The remaining series of stationary bars 17 are included for increased strength and stability of the stanchion structure S.

The top rail 10 includes a pair of horizontally spaced, elongated walls 25,25' which are welded or otherwise attached in opposing relationship to the upper ends of the stationary bars 15 and 17. The space between the vertical walls 27 of the angle irons 25,25' defines a track 30 slightly greater than and in which the upper ends of pivoting standards 20 are loosely retained for lateral movement. While the animals are moving into or out of the stations the J-shaped swinging standard 20, mounted on pivot pin 22 is tilted outwardly from the station, away from stationary bar 15 (dotted lines in FIG. 1). This position increases the width of the station allowing adequate room for the animal's head to move therethrough.

The solid lines in FIG. 1 indicate the position of swinging standard 20 when it is tilted inwardly toward the stationary bar 15 to lock the animal in the station. Thw swingable standard 20 is activated to tilt inwardly in the direction of the arrow "a" by the animal when it lowers its head into the J-shaped extension 35 of the standard to reach the feeding box (not shown). A chain or other flexible linking element 37 extends between stanchion 15 to limit the opening of standard 20 and to prevent the animal's neck slipping therethrough. As the animal feeds, its neck will move against the shorter portion 35a of the extension, causing it to tilt inwardly toward stationary standard 15. At that point, if the control rod 40 is in the activated position, the pivot standard 20 will be blocked from return movement outwardly and the animal will be locked therein. In the closed position the distance between standards 15, 20 is less than the width of the cow's head therein.

The control rod 40 is utilized to control the locking function of the cattle stanchion. In FIG. 1 the control rod 40 is shown extending longitudinally of top rail 10, supported against the wall 25. The rod 40 is held in position by a plurality of metal loops or sleeves 42 welded to the wall 25. Plates 60 are welded to rod 40 at spaced points therealong to activate and deactivate bail 50 by lifting tongue 52 out of trackway 30 responsive to sliding movement of rod 40. The rod moves therein in the direction of the arrow "b" to lock or unlock the pivot bars 20. Handle means 45 is utilized to move the control rod backwardly and forwardly. The handle 45 is of conventional design and represents only one of several known means of moving the control rod.

To condition the stanchion S for automatic locking, the control rod 40 is moved to its locking position shown in FIG. 3 by pushing handle 45 to the right (FIG. 1). In that position, the locking bail 50 is allowed to drop by gravity downwardly such that the blocking tab or tongue 52 (best shown in FIG. 3) extends into track 30 to a blocking position engaging the upper end of swing standard 20, with ears 54 resting on the top edges of the walls 25,25' of the track. Thus engaged, the pivot bar 20 cannot tilt away from bar 15 to release the animal and is thus locked.

FIG. 2 illustrates in detail the locking bail 50 in its disengaged position whereby the upper end of standard 20 is freely movable in both directions in the track 30. To disengage the locking bail, the handle 45 is pulled to the left (FIG. 1) such that the control bar 40 moves to the second position with the support plates 60 supporting the tab 52 outside of the track 30. The locking bail pivots freely upwardly and downwardly (arrow c) such that the support plate 60, or swinging standard 20, can move thereunder as required. For this purpose one end of the locking bail is attached to walls 25,25' by pivot pin 56 and as stated above the free end will drop by gravity into the track 30 when the plate 60 is moved away. The ears 54 prevent the locking bail from dropping through the track.

If it is desired that a single animal be released exclusive of others, the operator may manually lift the locking bail 50 out of the track 30 to release the bar 20. After the animal is released the locking bail may be dropped back into the track or tilted 180° to rest upside down in the track. This is a simple operation taking only seconds to perform when it is desirable to release only selected animals.

Under routine circumstances when it is desirable to simultaneously release all animals, the control bar is moved, as previously described, to the position shown in FIG. 2. As the bar 40 moves laterally, the support plate 60 which is attached thereto moves underneath the locking bail 50. The plate 60 pushes the stop plate 54 up and off the track walls 27, coming to rest beneath the tongue 52 above track 30. Thus, the animals are immediately free to move out of the stations and the operator is free to move ahead to other duties.

Construction of the stanchion is preferably from a heavy duty tubular pipe as illustrated. However, it is obvious to those skilled in the art that the stanchion S may be constructed from other materials. Additionally, it will be obvious to those skilled in the art that other and further modifications may be made to the present invention without departing from the scope of the claims below.

What is claimed is:

1. An improved locking mechanism for self-locking cattle stanchions of the type where each cattle station is defined by a stationary upright standard extending vertically between longitudinally extending upper and lower rails on one side of the cow's head and a generally upright swinging standard extending between the upper and lower rails on the other side of the cow's head, which swinging standard is automatically activated between a first inclined access position and a second upright locked position by the cow as its head is moved around when feeding, comprising:

(a) said upper rail formed by a pair of spaced walls slidably receiving and restraining the upper end of said swinging standard therebetween;
    (b) a locking bail means having one end thereof pivotally attached at a pivot point to said upper rail, the other end of said bail means having an inclined tongue portion extending down between said spaced walls at a point between the position of the upper end of said swinging standard in said first access position and said second locked position;
    (c) said inclined tongue portion when in position between said walls, allowing movement of said swinging standard underneath said tongue portion in a direction away from said pivot point from said first to said second position, and wherein when said swinging standard is in said second position said tongue portion extends below the upper end of said swinging standard to block movement of said swinging standard from said second to said first position.

2. The locking mechanism according to claim 1 and further including a deactivating means for selectively holding said tongue portion of said bail means out from between said spaced walls, thereby permitting free movement of the upper end of said swinging standard in either direction.

3. The locking mechanism according to claim 2 wherein said deactivating means includes a support plate slidably positioned upon said upper rail for movement between a first position out of engagement with said bail and a second position supporting said tongue portion above the level of said spaced walls, and means for moving said support plate between said first and second position.

4. Self-locking cattle stanchions of the type having a series of individual cattle stations, said stanchions including:

(a) horizontally extending top and bottom rails;
    (b) said top rail comprising a pair of spaced walls extending substantially the length of the stanchion and mounted in parallel relationship to define a track having at least an open bottom;
    (c) a plurality of horizontally spaced, first stationary standards extending vertically between said top and bottom rails;
    (d) a plurality of second standards each positioned in horizontally spaced relationship with one of said first standards to define a cattle station therebetween, each of said second standards being pivotally mounted to said bottom rail and extending upwardly through said open bottom of said track, the upper ends of said second standards moving laterally in said track between an inclined open position angled upwardly away from said first stationary standard and a substantially vertical closed position whereby cattle are locked into the station;
    (e) a locking means provided for each of said second standards, said locking means pivotally attached at a pivot point to said top rail and having one end portion thereof urged by gravity into a blocking position between said spaced walls; said end portion being momentarily movable from said blocking position within said track to a second position out of said track responsive to movement of said second standard in a direction away from said pivot point from said inclined open position to said vertical position;
    (f) said end portion of said locking means, after said second standard is in said vertical position, extending below said upper end of said second standard to block movement of said second standard back to said inclined position.

5. A cattle stanchion according to claim 4 wherein each of said locking means includes a locking bail having one end thereof pivotally attached to said track, the other end thereof having an inclined tongue portion extending down between said spaced walls.

6. The cattle stanchion according to claim 5 and further including a control rod extending parallel to and attached to one of said spaced walls, means for moving said control rod between a first and second position, a lock deactivating means operatively connected to said control rod and extending across said track beneath each of said bails for supporting said locking bail in a first, deactivated position with said tongue outside of said track when said control rod is in said first position; said locking bail falling by gravity to a second activated position extending into said track when said deactivating means is removed from beneath said bail when said control rod is in said second position.

7. A cattle stanchion according to claim 6 wherein each of said lock deactivating means comprises a plate means attached to said control rod and extending laterally therefrom across the top of said track in a position operatively adjacent the corresponding one of said locking bails.

8. An improved pivot standard for self-locking cattle stanchions of the type where each cattle station is defined by a stationary upright standard extending vertically on one side of the cow's head between longitudinally extending upper and lower rails, said upper rail being formed by a pair of spaced side walls, and a generally upright swinging or pivot standard on the other side of the cow's head extending between the upper and lower rails, said improved pivot standard comprising a generally J-shaped bar rigidly pivotally attached at the curved portion thereof to said lower rails and with the longer upright extending upwardly to an upper end which is retained and laterally movable between said side walls, the majority of the weight of the pivot standard being counterbalanced in said longer upright whereby said standard is normally urged by gravity to the open position, the shorter upright thereof extending upwardly away from said stationary standard and forming a surface which will be adjacent a cow's neck and against which movement of the cow's neck will urge said longer upright to a substantially vertical position, and means on said upper rail for locking said longer upright in said vertical position.

9. The improved pivot standard according to claim 8 wherein said locking means comprises:
   (a) said upper rail formed by a pair of spaced walls slidably receiving and restraining the upper end of said swinging standard therebetween;
   (b) a locking bail means having one end thereof pivotally attached to said upper rail, the other end of said bail means having an inclined tongue portion extending down between said spaced walls at a point between the position of the upper end of said swinging standard in said open position and said vertical position;
   (c) said inclined tongue portion when in position between said walls, allowing movement of said swinging standard from said open to said vertical position, but preventing movement of said swinging standard from said vertical to said open position.

* * * * *